(12) United States Patent
Dross

(10) Patent No.: US 9,903,543 B2
(45) Date of Patent: Feb. 27, 2018

(54) LIGHTING DEVICE PROVIDING LIGHT MIXED FROM SEVERAL LIGHT SOURCES

(71) Applicant: PHILIPS LIGHTING HOLDING B.V., Eindhoven (NL)

(72) Inventor: Oliver Dross, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/322,513

(22) PCT Filed: Jul. 1, 2015

(86) PCT No.: PCT/EP2015/064921
§ 371 (c)(1),
(2) Date: Dec. 28, 2016

(87) PCT Pub. No.: WO2016/001271
PCT Pub. Date: Jan. 7, 2016

(65) Prior Publication Data
US 2017/0138547 A1     May 18, 2017

(30) Foreign Application Priority Data
Jul. 1, 2014   (EP) .................................... 14175126

(51) Int. Cl.
*F21V 13/04*      (2006.01)
*F21K 9/62*       (2016.01)
(Continued)

(52) U.S. Cl.
CPC ................ *F21K 9/62* (2016.08); *F21V 13/04* (2013.01); *G02B 27/149* (2013.01); *F21Y 2113/13* (2016.08); *F21Y 2115/10* (2016.08)

(58) Field of Classification Search
CPC .......... F21K 9/62; G02B 27/149; F21V 13/04
See application file for complete search history.

(56) References Cited

U.S. PATENT DOCUMENTS 2,673,923 A * 3/1954 Williams ........... G02B 27/1006
355/32
3,905,684 A * 9/1975 Cook ................. G02B 27/1006
348/259
(Continued)

FOREIGN PATENT DOCUMENTS

WO      2009016604 A1    2/2009
WO      2010044030 A1    4/2010

*Primary Examiner* — Thomas M Sember
(74) *Attorney, Agent, or Firm* — Akarsh P. Belagodu

(57) ABSTRACT

A lighting device (100) comprising a collimator (112) having an entrance aperture and an exit aperture (302), a crossed beam splitter (106, 206) and at least four lighting units. Each of the lighting units comprises a light source (102) and a focusing element (104) having an entrance aperture (308) arranged to receive light from the light source (102) and an exit aperture (304). The focusing element (104) is configured to focus light towards the beam splitter (106, 206), and the crossed beam splitter is arranged to receive light from each of the lighting units and configured to split the light from each light source into four beams. Further, the beam splitter (106, 206) is arranged and configured such that said four beams are directed towards the entrance aperture of the collimator (112). The collimator (112) is configured to interact with said beams to provide four images, each image comprising one fourth of the light from each lighting unit.

10 Claims, 4 Drawing Sheets

(51) Int. Cl.
*G02B 27/14* (2006.01)
*F21Y 115/10* (2016.01)
*F21Y 113/13* (2016.01)

(56) References Cited

U.S. PATENT DOCUMENTS

| | | |
|---|---|---|
| 6,139,166 A | 10/2000 | Marshall et al. |
| 7,806,558 B2 | 10/2010 | Williamson |
| 8,525,000 B2 | 9/2013 | Brukilacchio |
| 2004/0232812 A1 | 11/2004 | Beeson et al. |
| 2005/0190562 A1 | 9/2005 | Keuper et al. |
| 2006/0239006 A1 | 10/2006 | Chaves et al. |
| 2008/0074752 A1* | 3/2008 | Chaves .............. G02B 27/1006 359/641 |
| 2010/0033946 A1 | 2/2010 | Chaves et al. |
| 2010/0060859 A1 | 3/2010 | Krijn et al. |
| 2011/0199780 A1 | 8/2011 | Kpenv |
| 2012/0268930 A1 | 10/2012 | Lu |
| 2013/0088142 A1 | 4/2013 | Allen |

* cited by examiner

LIGHTING DEVICE PROVIDING LIGHT MIXED FROM SEVERAL LIGHT SOURCES

CROSS-REFERENCE TO PRIOR APPLICATIONS

This application is the U.S. National Phase application under 35 U.S.C. § 371 of International Application No. PCT/EP2015/064921, filed on Jul. 1, 2015, which claims the benefit of European Patent Application No. 14175126.3, filed on Jul. 1, 2014. These applications are hereby incorporated by reference herein.

FIELD OF THE INVENTION

The present invention relates to a lighting device providing light mixed from several light sources.

BACKGROUND

Lamps or lighting devices which comprise light emitting diodes (LEDs) may contain LEDs of several colors in order to either allow color adjustment or enable a higher color rendering index (CRI). For such devices there is a desire to provide light which is uniform in regards to color and intensity in the far field, e.g. at the surface, object or room which is being lit by such a device but also in the near field e.g. when an observer is looking at the device. However, in order to achieve an efficient CRI using several LEDs of different color it is common to use several reflectors or collimators which results in different colors being observed in the near field. A solution to this particular problem is to use a single collimator which collimates the light from several LEDs with additional mixing means. One known solution consists of a total internal reflection (TIR) collimator which has faceting on the exit aperture in order to diffuse the light, in some cases this is not enough and faceting is used on the internal reflection surfaces or even including diffusing elements within the body of the TIR collimator.

However, even in devices using a single collimator the mix of colors is still incomplete such that different colors are still visible when observing the near field e.g. looking into the collimator. Further, the faceting provides a wide beam from the collimator, which will not enable a narrow and mixed beam of light i.e. there will be a strong Etendue dilution.

U.S. Pat. No. 6,139,166 propose using a beam splitter to mix light from LEDs which emit light of different colors. However, color mixing of several sources requires more than one mixing stage and the proposed device uses a prismatic block comprising mirrors which may result in losses.

Hence, there is still a need for a lighting device which can provide a narrow beam while mixing light from several light sources in both the near field and far field.

SUMMARY

With regards to the above-mentioned desired properties of a lighting device, it is a general object of the present invention to provide a lighting device which can provide a narrow beam comprising an even mix of light from several light sources.

According to a first aspect of the invention, these and other objectives are achieved with a lighting device comprising a collimator having an entrance aperture and an exit aperture, a crossed beam splitter comprising a first surface element and a second surface element which is arranged perpendicular to said first surface element, the first and second surface elements being configured to transmit and reflect approximately equal parts of light which is incident upon said first and second surface element, respectively, and at least four lighting units, each of said lighting units comprising a light source and a focusing element having an entrance aperture arranged to receive light from said light source and an exit aperture, the focusing element being configured to focus light towards said beam splitter. The crossed beam splitter is arranged to receive light from each of said lighting units and configured to split the light from each light source into four beams, and is further arranged and configured such that said four beams are directed towards said entrance aperture of said collimator. The collimator is configured to interact with said beams to provide four images, each image comprising one fourth of the light from each lighting unit.

By lighting device it should be understood that the purpose of the device is to provide lighting for either general illumination or spot lighting.

Each surface element should herein be construed as being able to split incident light from a lighting unit into a transmitted portion and a reflected portion of substantially equal proportions. By equal proportions it should be understood that of the light incident upon the beam splitter, about half is transmitted and half is reflected.

The collimator should be understood to reflect and mix light which enters the collimator through the entrance aperture, and to emit light through the exit aperture which is collimated or focused. Further, the collimator is configured such that light leaving the collimator comprises a substantially equal part of light from each light source at each point in the exit aperture and results in an even mix of the light from the different light sources when observed in the far field. Thereby, it should be understood that the transmitted and reflected portions, having been split in the beam splitter, from different light sources will reach the collimator and are mixed as the collimator is configured such that the transmitted portion of light from one lighting unit is mixed with the reflected portion of light from the remaining of the lighting units. This will result in a substantially equal part of light from each light source at each point in the exit aperture. In other words, the intensity distribution of light in the near field must not be homogeneous, but every point in the near field should comprise an equal portion of light from each light source. Through the configuration of the collimator, the intensity distribution in the far field exhibits a substantially homogenous intensity distribution and also an even mix of light from the different light sources.

The lighting units comprise a light source and a focusing element. The light source is the component of the device which, in use, emits and provides the light. The light source could be an array of smaller sources as well. The focusing element receives the light from the light source and focuses the light towards the beam splitter.

The present invention is based on the realization that by using focusing elements which focus the light from light sources to a beam splitter arranged such that both transmitted and reflected portions of light are directed towards an entrance aperture of a collimator, and the collimator being configured to mix the transmitted and reflected portions, a narrow beam of light comprising a mix of light from different light sources can be provided. The present invention thus enables a narrow beam of light which comprises a mix of light produced by the light sources to be observed in the far field, and in the near field an equal part of light from each light source can be observed at each point in the exit aperture. Hence, a mix of the light produced by the light sources will also be observed in the near field. Further, the lighting device does not require the light to undergo several reflections which would cause the light to lose flux and or luminance. Another advantage of the present invention is that the lighting units and beam splitter are small enough to allow the lighting device to be used as a retrofit in current light fixtures such as standard PAR-lamp fixtures or Edison screw bases (E17, E27 etc.). Yet another advantage is that no additional mixing device or component is required as the mixing of light occurs in the collimator.

By providing the beam splitter as comprising surface elements which transmits and reflects approximately equal parts of light which is incident upon the surface, a thin and simple beam splitter design is provided. Thereby, the beam splitter can be made at a low cost and with cheap materials.

Advantageously, the present invention further allows for a mix of light from four lighting units and thereby four different light sources by adding a second surface of the beam splitter which is perpendicular to the first surface. Four light sources may achieve a higher CRI or desired color. Furthermore, four lighting units will also provide more light and illuminate a larger portion of the exit aperture of the collimator. By illuminating a larger portion of the exit aperture of the collimator a higher on axis intensity is provided from the lighting device.

According to another embodiment of the invention, the light sources may emit light of a different wavelength. By using light sources of different wavelengths i.e. color, the mix of light from each light source will enable the light in to be a mix of the colors of the light sources. Thereby, the lighting device will have a desirable color in both the far field and near field.

According to one embodiment of the invention, the focusing elements may be TIR elements. TIR elements are used as focusing elements for the light sources to achieve efficient guiding and focusing of the light into a small region which is, in use, being emitted from the light sources.

According to another embodiment of the invention, the light sources may be light emitting diodes. Light emitting diodes are used as light sources as they are energy efficient. Light emitting diodes should be understood as LED dies, LED subassemblies or packaged LEDs.

According to one embodiment of the invention, the collimator may be a parabolic reflector. A parabolic reflector which focuses and directs the light from the entrance aperture coming from the beam splitter to a distant target is a simple construction with well known properties and may thus be configured to a certain distance or a degree of focus.

According to another embodiment of the invention, the collimator may be a TIR Fresnel lens. A TIR Fresnel lens is thin and can thus enable the lighting device to be smaller. Moreover, a TIR Fresnel lens may have a large aperture which is advantageous if the lighting device is to be used for general illumination. Other types of optical elements could also be used to embody the collimator of the present invention such as RXI optics, a UFO lens, a refractive Fresnel lens or a slat collimator.

According to one embodiment of the invention, the exit aperture of the collimator may be circular. A circular exit aperture is preferably used in order to allow the lighting arrangement or device to function as a replacement to currently used spotlights or similar lamps.

According to another embodiment of the invention, the exit aperture of the collimator may comprise diffusing elements. In order to further mix the light being emitted by the lighting device, diffusing elements are provided on the exit aperture of the collimator.

According to one embodiment of the invention, the exit aperture of the focusing elements may comprise diffusing elements. The illuminance distribution of light sources of different colors may be different. By providing diffusing elements on the exit aperture of the focusing elements a better mix is achieved.

According to another embodiment of the invention, each of the light sources may emit light of a wavelength from the group: 465 nm, 520 nm, 575 nm or 630 nm. An even mix of the above wavelengths will produce light which is aesthetically pleasing and can produce a high CRI.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing different embodiments of the invention.

DETAILED DESCRIPTION

In the present detailed description, embodiments of a lighting device according to the present invention are mainly discussed with reference to a lighting device which is designed as a retrofit. It should be noted that this by no means limit the scope of the invention, which is also applicable in other circumstances for instance with other types or designs of lighting devices. Further, the present invention is mainly discussed using a parabolic reflector as the collimator; however the present invention is also applicable where the collimator is of any other type which is suitable for a lighting device providing spot lighting or general illumination. Moreover the arrangement of light sources shown in the enclosed drawings is only a schematic representation. In use, the number, concentration and other such details will be decided by each application.

The invention will now be described with reference to the enclosed drawings where first attention will be drawn to the structure, and then secondly the function.

Figure 1:
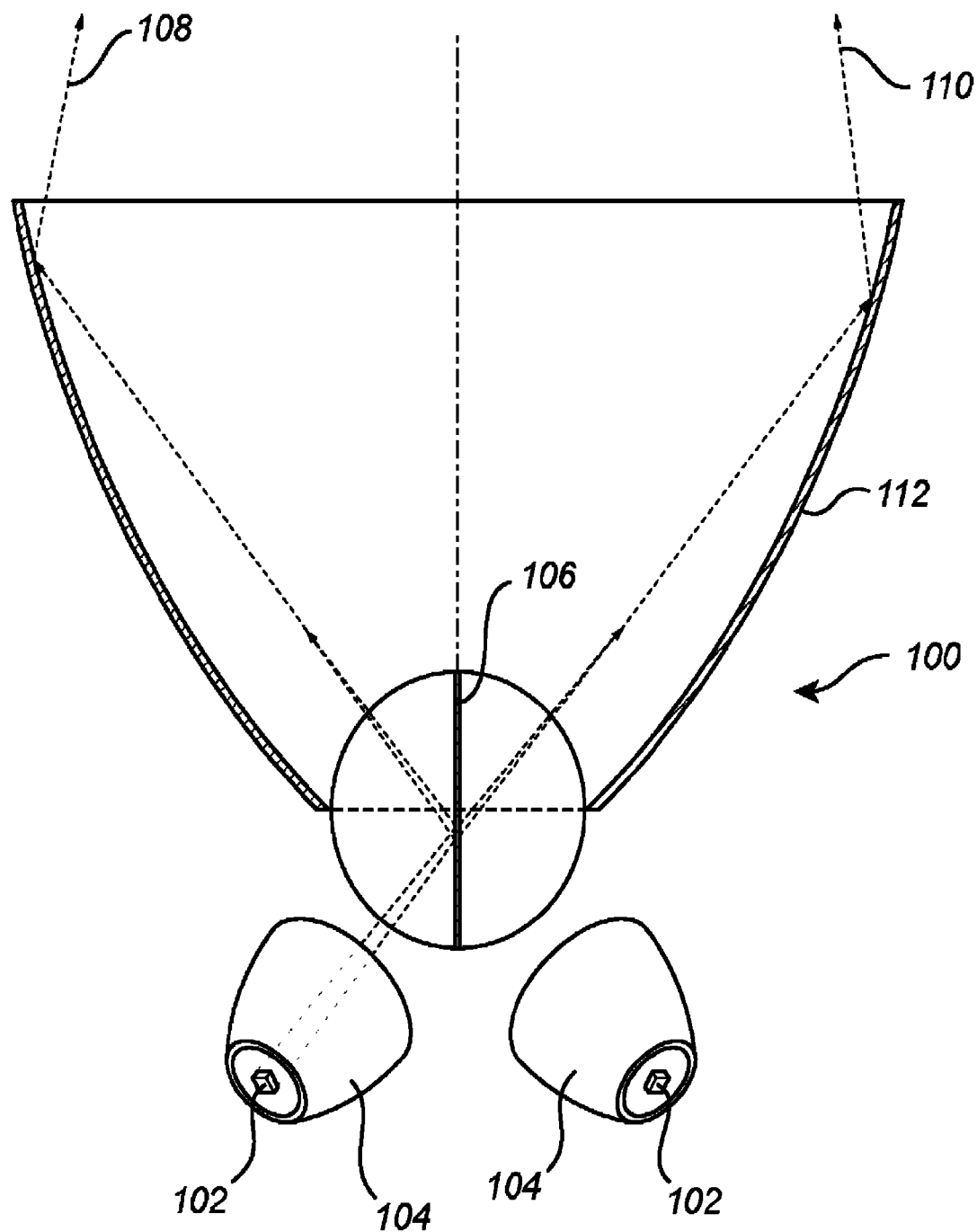
FIG. 1 and is a cross-sectional side view of a lighting device according to one embodiment of the invention.

FIG. 1 is a cross-sectional side view of a lighting device 100. The lighting device 100 comprises a collimator 112 in the form of a parabolic reflector which has an entrance aperture and an exit aperture. Other types of optical elements could also be used to embody the collimator 112 such as TIR Fresnel lens, RXI optics, a UFO lens, a refractive Fresnel lens or a slat collimator. The lighting device 100 also comprises a beam splitter 106 arranged at the entrance aperture of the collimator 112. Further, the lighting device 100 comprises two lighting units each comprising a focusing element 104 and a light source 102. The focusing elements 104 may for instance be TIR elements. The light sources 102 can be any solid state light sources such as light emitting diodes in the form of LED dies, LED subassemblies or packaged LEDs. The focusing element 104 focuses the light from the light source 102 towards the beam splitter 106.

The beam splitter 106 is arranged to receive the light from each of the lighting units and configured to split the light into a transmitted portion 110 and a reflected portion 108. The beam splitter 106 is configured to split approximately half the light into the transmitted portion 110 and half the light into a reflected portion 108. The beam splitter 106 herein is embodied by a substantially planar surface element which transmits and reflects approximately equal parts of light which is incident upon the surface element. The beam splitter 106 can be realized by a semi-reflective layer comprising portions of reflective areas and portions of transmissive areas. The reflective areas will reflect the light incident upon them, and the transmissive areas will allow light which is incident upon them to be transmitted thereby resulting in a reflected and a transmitted portion of the light which was incident on the beam splitter 106. The semi-reflective layer can therefore comprise an array of isolated reflective areas against a transparent background. Further, the beam splitter 106 can also be realized by a beam splitting foil such as a partially mirrored plastic which is then laminated onto a transparent carrier. Moreover, a beam splitter 106 may be realized by directly coating a thin carrier plate with aluminum or silver and then providing suitable slits in the coating.

Note that the beam splitter 106 and the lighting units are arranged and configured such that both the transmitted light 110 and the reflected light 108 from each of the lighting units is directed towards the entrance aperture of the collimator 112. In other words, the light which is emitted from each of the light sources 102 is focused towards the beam splitter 106 by the focusing element 104, and the beam splitter 106 is arranged at the entrance or in such a manner that the light being transmitted and reflected by the beam splitter, i.e. the light being emitted by the light sources 102 reaches the entrance aperture of the collimator 112. The transmitted and reflected portions of light are mixed in the collimator 112 as the parabolic shape of the collimator 112 will provide a transmitted portion 110 of light from either lighting unit to be emitted in the same direction as a reflected 108 portion of light from the other of the lighting units. Thereby, the light leaving the collimator 112 comprises a substantially equal part of light from each light source at each point in the exit aperture and results in an even mix of the light from the different light sources 102 when observed in the far field.

Hence, in use, the light sources 102 emit light which is focused by the focusing element 104 towards the beam splitter 106. The light incident upon the beam splitter 106 is then split into a transmitted portion 110 and a reflected portion 108 by the beam splitter 106. Note that this will occur for both the lighting units of the lighting device 100 and thus results in that the light leaving the collimator 112 comprises a substantially equal part of light from each light source at each point in the exit aperture as the transmitted portions 110, from a lighting unit mix with the reflected portions 108 of the other lighting unit in the collimator 112.

Figure 2:
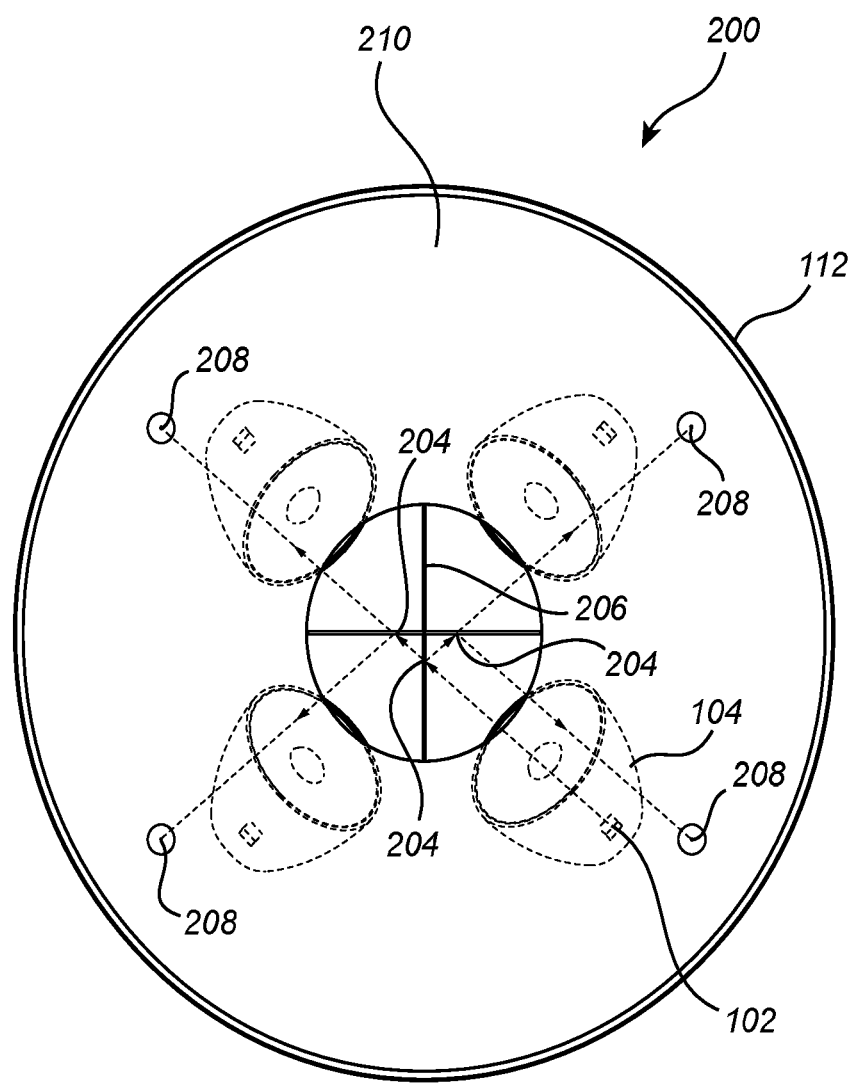
FIG. 2 is a cross-sectional top view of a lighting device according to another embodiment of the invention.

Referring now to FIG. 2 which is a cross-sectional top view of a lighting device 200. The lighting device 200 differs from the already mentioned lighting device 100 in that there is now two additional lighting units, i.e. four lighting units in total, which also comprise a focusing element 104 and a light source 102. The beam splitter 206 also differs in that it now comprises a second surface element arranged perpendicularly on respective sides of the first surface element. The first and second surface elements thus forms a beam splitter arranged as a cross, henceforth a crossed beam splitter 206. The crossed beam splitter 206 is required in order for the light leaving the collimator 112 to comprise a substantially equal part of light from each light source at each point in the exit aperture, and thus achieve an even mix of the light from four lighting units being observed in the far field. In use, the focusing element 104 will direct a converging beam of the light emitted from the light source 102 towards the center of the crossed beam splitter 206. At each interaction 204 with the crossed beam splitter 206 approximately half of the beam will be transmitted and the other half reflected. This is shown in FIG. 2 for a single beam of light from the light source 102. Thus, the crossed beam splitter 206 will split the light from a light source 102 into four beams in essentially perpendicular directions which beams of light reach the entrance aperture of the collimator 112. The four beams of light will reach and interact with the collimator at a plurality of points 208 where they will be reflected and emitted from the lighting device 200 through the exit aperture of the collimator 112. The described process is the same for all four lighting units, and thus four images which comprise one fourth of the light from each lighting unit will be provided from the collimator 112. Each image comprises an even mix of the light emitted from the light sources 102. In the far field the four images are focused and result in an even mix from all the light sources 102.

Figure 3:
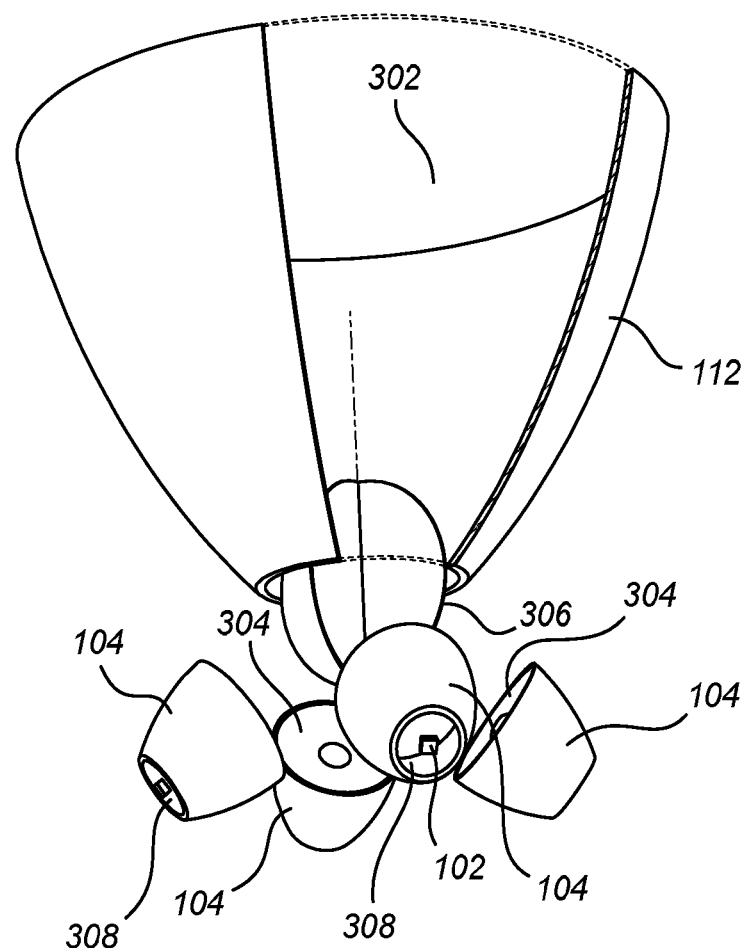
FIG. 3 is an exploded perspective view of a lighting device according to another embodiment of the invention.

In FIG. 3 a exploded perspective view of the lighting device 200 also shown in FIG. 2 is shown. The four lighting units shown comprise a light source 102 and a focusing element 104. Each focusing element 104 has an entrance surface 308 which receives light from the light source 102 and focuses the light through an exit aperture 304 towards the crossed beam splitter 306. In other words, the focusing elements 104 performs essentially the same function as an elliptical mirror with one focal point at the light source 102 and the second focal point at the common focus of all four elliptical mirrors, which marks the center position of the crossed beam splitter 306. The collimator 112 is shown as a parabolic reflector 112 of rotational symmetry. Other types of collimators 112 are also possible to use with a lighting device 200 according to the present invention such as a refractive or TIR Fresnel lens or any other type of collimation device. Note that the present invention allows for a circular exit aperture of the collimator 112 which allows the lighting device 200 to be fitted as a retrofit in standard light fixtures.

The exit aperture 302 of the collimator 112 can also comprise diffusing elements in order further mix the light leaving the collimator 112. In a similar manner, the exit aperture 304 of the focusing element 104 can comprise diffusing elements in order adjust to a difference in illuminance distribution from the light sources 102 having different colors.

Figure 4A:
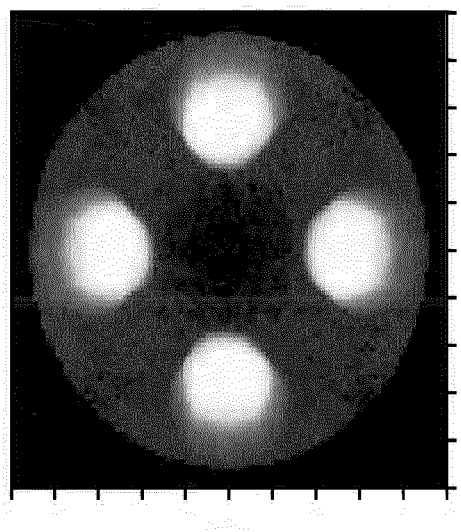
FIGS. 4A and 4B shows the illuminance distribution of light from a lighting device according to one embodiment of the present invention in the near field and far field respectively.

In FIG. 4A the illuminance distribution at the near field i.e. the exit aperture 302 of the lighting device 200 is shown. As the crossed beam splitter 206 provides four images, each being a fourth the light from each lighting unit, four illuminance peak areas can be seen in the exit aperture 302. Note that the light in these illuminance peak areas will comprise an essentially equal portion of light from each lighting unit. Hence, if the light sources 102 emit light of different color a mix of the different colors can be seen in each of the four intensity peak areas.

Figure 4B:
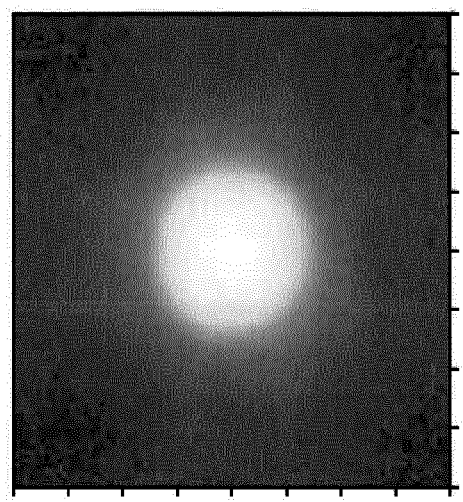

In FIG. 4B the intensity distribution of light at the far field of the lighting device 200 is shown. As the collimator 112 has collimated or focused the light the intensity distribution in the far field exhibits a substantially homogenous intensity distribution and also an even mix of light from the different light sources. Hence, there is only one intensity peak area in FIG. 4B.

Additionally, variations to the disclosed embodiments can be understood and effected by the skilled person in practicing the claimed invention, from a study of the drawings, the disclosure, and the appended claims. For instance, the skilled person would contemplate using more than two lighting units without a beam splitter comprising a second surface perpendicular to the first surface. Other types of light sources are of course also possible but preferably a solid state light emitter. Examples of solid state light emitters are Light Emitting Diodes (LEDs), Organic Light Emitting diode(s) OLEDs, or, for example, laser diodes. Other wavelengths than the ones mentioned would also be possible and within the scope of the present invention. In the claims, the word "comprising" does not exclude other elements or steps, and the indefinite article "a" or "an" does not exclude a plurality. The mere fact that certain measures are recited in mutually different dependent claims does not indicate that a combination may not be used to an advantage.

The invention claimed is:

1. A lighting device, comprising:
   a collimator having an entrance aperture and an exit aperture;
   a crossed beam splitter comprising a first surface element, and a second surface element which is arranged perpendicular to said first surface element, said first and second surface elements being configured to transmit and reflect approximately equal parts of light which is incident upon said first and second surface element, respectively;
   at least four lighting units, each of said lighting units comprising:
      a light source; and
      a focusing element having an entrance aperture arranged to receive light from said light source and an exit aperture, said focusing element being configured to focus light towards said beam splitter;
   said crossed beam splitter being arranged to receive light directly from the focusing element of each of said lighting units and configured to split the light from each light source into four beams;
   wherein said crossed beam splitter is further arranged and configured such that said four beams are directed towards said entrance aperture of said collimator; and
   said collimator is configured to interact with said beams to provide four images, each image comprising one fourth of the light from each lighting unit.

2. A lighting device according to claim 1, wherein the light sources emit light of different wavelengths.

3. A lighting device according to claim 1, wherein said focusing elements are TIR elements.

4. A lighting device according to claim 1, wherein said light sources are light emitting diodes.

5. A lighting device according to claim 1, wherein said collimator is a parabolic reflector.

6. A lighting device according to claim 1, wherein said collimator is a TIR Fresnel lens.

7. A lighting device according to claim 1, wherein said exit aperture of said collimator is circular.

8. A lighting device according to claim 1, wherein said exit aperture of said collimator comprises diffusing elements.

9. A lighting device according to claim 1, wherein said exit aperture of said focusing elements comprises diffusing elements.

10. A lighting device according to claim 1, wherein each said light sources emit light of a wavelength from the group: 465 nm, 520 nm, 575 nm or 630 nm.

* * * * *